United States Patent
Hermann et al.

(10) Patent No.: US 9,422,999 B2
(45) Date of Patent: Aug. 23, 2016

(54) SPRING FUNCTIONAL COMPONENT FOR A HYDROELASTIC BEARING AND HYDROELASTIC BEARING

(71) Applicant: Anvis Deutschland GmbH, Steinau an der Strasse (DE)

(72) Inventors: Waldemar Hermann, Jossgrund (DE); Dimitry Khlistunov, Bad Soden-Salmuenster (DE); Frank Widmayr, Bad Soden-Salmuenster (DE); Alexei Mysin, Togliatti (RU)

(73) Assignee: Anvis Deutschland GmbH, Steinau an der Strasse (DE)

(*) Notice: Subject to any disclaimer, the term of this patent is extended or adjusted under 35 U.S.C. 154(b) by 109 days.

(21) Appl. No.: 14/066,818

(22) Filed: Oct. 30, 2013

(65) Prior Publication Data
US 2014/0117601 A1    May 1, 2014

(30) Foreign Application Priority Data
Oct. 31, 2012 (DE) .................. 10 2012 021 386

(51) Int. Cl.
F16F 1/44 (2006.01)
F16F 13/14 (2006.01)
F16F 7/00 (2006.01)

(52) U.S. Cl.
CPC ........ F16F 13/1409 (2013.01); F16F 13/1445 (2013.01)

(58) Field of Classification Search
CPC .. F16F 13/14; F16F 13/1409; F16F 13/1445; F16F 13/1427
USPC ...... 267/292, 293, 141, 141.2, 141.3, 141.6, 267/140.12
See application file for complete search history.

(56) References Cited

U.S. PATENT DOCUMENTS

| | | | | |
|---|---|---|---|---|
| 6,029,960 | A * | 2/2000 | Gab | 267/140.12 |
| 6,382,605 | B1 * | 5/2002 | Kato | 267/141.2 |
| 7,104,533 | B2 * | 9/2006 | Kato et al. | 267/140.12 |
| 7,370,852 | B2 * | 5/2008 | Nicholson et al. | 267/140.12 |
| 7,748,689 | B2 * | 7/2010 | Thibault et al. | 267/140.12 |
| 2009/0179360 | A1 * | 7/2009 | Quinn et al. | 267/140.11 |

* cited by examiner

*Primary Examiner* — Melody Burch
(74) *Attorney, Agent, or Firm* — Dennis J. Williamson; Moore & Van Allen PLLC

(57) ABSTRACT

A spring functional component for a hydroelastic bearing. The component comprises a mounting inner connection, a mounting outer connection radially surrounding the mounting inner connection, a spring body which delimits at least two working chambers for receiving a damping fluid and couples the mounting inner and outer connections to one another in order to allow a relative movability between the mounting inner and outer connection and a support frame surrounding the mounting inner connection made of a rigid material such as plastic or metal, on which at least one radial stop is held, wherein the radial stop can be displaced from a pre-assembly state, in which a stop end of the radial stop is disengaged with respect to a stop counterpiece on the mounting inner connection side or mounting outer connection side, into a final assembly state in which the stop end engages the stop counterpiece.

19 Claims, 2 Drawing Sheets

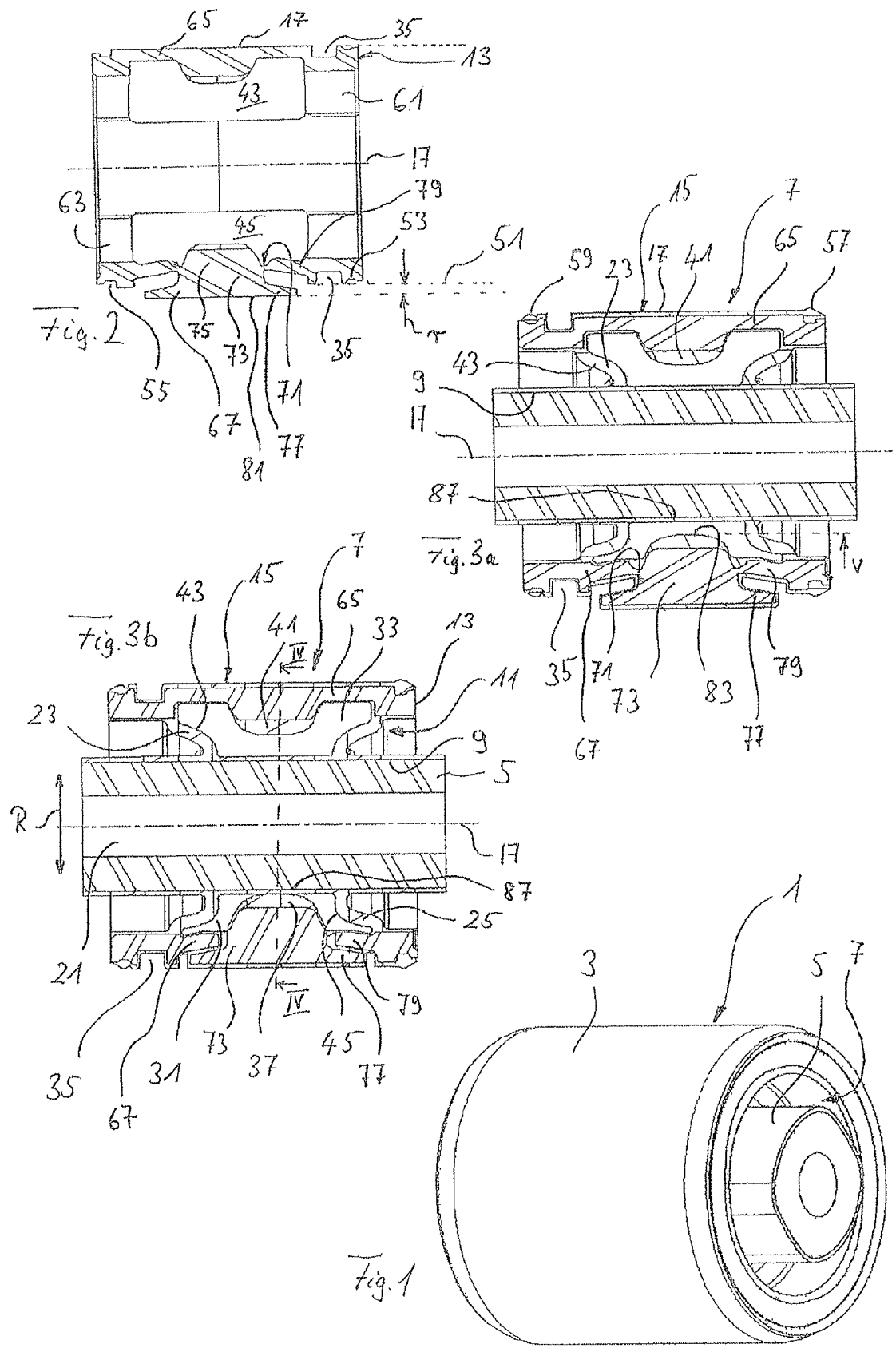

SPRING FUNCTIONAL COMPONENT FOR A HYDROELASTIC BEARING AND HYDROELASTIC BEARING

This application claims the benefit of priority under 35 U.S.C. 119 to German Patent Application Serial No. 10 2012 021 386.7 filed on Oct. 31, 2012, the contents of which are hereby incorporated by reference in their entirety.

Aspects disclosed herein relate to a spring functional component for a hydroelastic bearing, in particular for use in a motor vehicle. The hydroelastic bearing can be used, for example, for mounting a cross member or a control arm, in particular a wishbone. When used as a cross member bearing, an arrangement of several hydroelastic bearings, in particular of four hydroelastic bearings may be provided, which are to be mounted at four fixed mounting positions on the motor vehicle. In the mounted state the hydroelastic bearings of the arrangement may be arranged in such a manner that their axial direction coincides with a vertical.

A hydroelastic bearing is generally used when a relative movement of a vibration-loaded component such as a motor vehicle component with respect to the bodywork is to be allowed and damped. As a result of the use of elastomeric material the hydroelastic bearing provides restoring spring forces as well as damping forces produced actively by means of dissipation losses in the bearing.

In general, a spring functional component has a mounting inner connection via which the bearing is to be mounted on a component exposed to a vibrational load such as the bodywork of a motor vehicle. Another component such as a motor vehicle component to be connected to the motor vehicle body work is usually fastened to the spring functional component via a mounting outer connection. An inverse connection of the spring functional component to the motor vehicle bodywork and the motor vehicle component can also be considered. A spring body couples the mounting connections to one another in order to allow a relative movability between the mounting connections. The spring body delimits, at least partially, two working chambers for receiving a damping fluid. The working chambers can communicate fluidically with one another via a connecting channel in order to still allow an exchange of fluid between the working chambers with a defined cross-sectional narrowing and to produce the dissipation losses by the flow between the working chambers. Damping properties may be set by adjustments of the flow resonance of the working chamber arrangement.

In a hydroelastic bearing it is necessary to keep the maximum movement amplitude of the mounting connections relative to one another within limits in order to avoid any overshoot and therefore structural damage to the spring body. For this purpose a radial elastomeric stop attached on the side of the mounting inner connection is used. It has been found that radial stops located on the mounting inner connection either do not have sufficient fatigue strength or only possess a sufficient strength if the surface extension thereof is sufficiently large. Such radial stops on the mounting inner connection side require an increased installation space for the hydroelastic bearing in the axial direction. Alternatively it can be provided to insert an elastomeric radial stop separated into the respective working chamber on an inner side of an outer sleeve. To this end, for mounting the separate radial stops it is necessary to configure the support frame as multipart in order to establish an access to the interior of the working chamber.

In many radial stops in hydroelastic bearings the stop function is only realized when a free movement between the mounting inner connection and the mounting outer connection is realized. Also the stop function only occurs when in particular an elastic radial stop is elastically deformed up to a certain degree after the impact.

There is therefore a need to provide a hydroelastic bearing having a rapidly acting radial stop function, which in particular is simple to produce and has a sufficient fatigue strength.

According to an embodiment disclosed herein, a spring functional component for a hydroelastic bearing is provided, in particular for connecting a motor vehicle component to a motor vehicle bodywork. The spring functional component has a mounting inner connection for mounting the bearing in particular on a vehicle bodywork, for example, a bodywork flange or bolt, and a mounting outer connection for mounting the spring functional component in particular on a motor vehicle component or on a bushing to be connected to the motor vehicle component, which for example can be designed in one piece as part of the motor vehicle component. The mounting inner connection can be formed by an inner fitting of a rigid material such as plastic or metal, preferably aluminum. Alternatively it is possible to form the mounting inner connection exclusively by a recess in the spring body of the hydroelastic bearing without using a rigid inner fitting. The mounting outer connection can, for example, be the circumferential outer side of the spring functional component which is preferably designed in such a manner that it can be pressed firmly into a separate connecting part such as a sleeve or bushing of the motor vehicle component. If the bushing is designed as an outer fitting of the hydroelastic bearing separate from the motor vehicle component, a functional hydroelastic bearing is achieved by assembly of the spring functional component such as pressing-in, into the bushing. Furthermore the hydroelastic bearing according to some embodiments has a sleeve-like support frame surrounding the mounting inner connection made of a rigid material such as plastic or metal, preferably aluminum. The closed circumferential support frame can be cylindrical, oval or polygonal according to the design of the bearing. The support frame defines an axial direction and is designed to be annular and closed as a stiffening sleeve, in order to form a sufficiently rigid cage structure which is intended to stabilize the shape of the spring body or to stiffen it. The supporting frame can form the mounting outer connection or be substantially rigidly connected to it. The spring functional component comprises a spring body in particular made of elastomeric material which partially delimits at least two working chambers for receiving a damping fluid. The working chambers can communicate with one another via a connecting channel in order to allow an exchange of the working fluid between the working chambers. The spring body couples the mounting inner connection to the supporting frame in such a manner that a relatively movability between the mounting inner connection and the supporting frame is allowed. As a result of the elastic relative movability between the mounting inner connection and the support frame, the working chambers are deformed in a load-dependent manner with the result that a dissipating fluid flow exchange takes place between the working chambers.

The spring functional component can have at least one radial opening open towards the radial outer side thereof for each of the at least two working chambers, into which respectively one working chamber leads. For closure of the working chambers at the radial opening of the spring functional component, a connection part such as an external fitting of the hydroelastic bearing, for example, an external bushing can be provided radially surrounding the support frame on a mounting outer connection, which connection part closes the radial openings of the spring functional component in a fluid-tight manner. The support frame may not include this function; it is generally used for stiffening the through opening of the spring functional component and to allow access for forming the interior of the working chamber and each respective radial stop located therein. The external fitting of the hydroelastic bearing or a bushing receptacle of the motor vehicle component to be mounted, which replaces the external fitting, can also serve to seal the working chambers at the radial opening.

According to another embodiment disclosed herein, in the pre-assembly state the support frame holds the at least one radial stop in its entirety movable. The radial stop can, for example, be held on the support frame by molding or spraying an elastomeric protuberance onto the support frame over an elastic linkage which can be configured, for example, as a circumferential film hinge. In order to create the pre-assembly state of the spring functional component, the support frame is inserted into a vulcanization forming tool and overmolded under the formation of the radial stop together with elastic linkage. Alternatively the radial stop can comprise a rigid base plate which is firstly fabricated separately from the support frame but is then connected structurally to the support frame by inserting the rigid base plate together with the support frame into a vulcanization tool and the elastomeric protuberance together with elastic linkage is molded on the supporting frame and on the base plate. In this embodiment after the vulcanization process and achieving the pre-assembly state, the radial stop consisting of the base plate and the elastomeric protuberance is fastened elastically movably to the support frame. When the base plate is positioned separately, it is possible to use different rigid materials for the supporting frame and the base plate. For example, a plastic can be used for the base plate whereas the support frame is fabricated from a light metal such as aluminum, preferably die cast aluminum or steel sheet. An inverse choice of rigid materials or an identical material can also be used for the base plate and the support frame. It is further possible to fabricate the support frame and the base plate of the radial stop in one piece by providing, for example, a pre-determined breaking web or pre-determined bending web between the support frame and the base plate of the radial stop.

In a preferred embodiment, the spring functional component has precisely two radial stops which are disposed in diametrically opposite positions in order to provide a limitation of movement in a linear radial direction.

The elastomeric protuberance of the radial stop can be held on an inner side or outer side of the support frame, in particular molded on, depending on whether the at least one radial stop is intended to act for a limitation of the path in the radial direction outwards or inwards.

The at least one radial stop can be displaced from the pre-assembly state, in which a stop end of the radial stop is exposed or disengaged with respect to a stop counterpiece on the mounting inner connection side or mounting outer connection side, into a final assembly state in which the stop end engages or abuts against the stop counterpiece. The movability of the at least one radial stop is forced during assembly of the spring functional component by the actual operation of the hydroelastic bearing for which the spring functional component is used. During mounting, in particular insertion, of the spring functional component, exclusively the at least one radial stop is forced from the stable pre-assembly position into the final assembly state. In the final assembly state the at least one radial stop has exhausted its assembly movability and sits in a fixed position, where the at least one radial stop still has its stop movability according to which the spring body of the radial stop is plastically deformable in order to limit an operating movement of the hydroelastic bearing in the specific radial direction.

In the pre-assembly position the stop end of the at least one radial stop therefore lies at a distance from the stop counterpiece with which the stop end only comes into stop engagement when the spring functional component is mounted at the desired usage location. According to some embodiments, using an appropriate vulcanization forming tool which can project through radial openings of the spring functional component into the interior thereof, it is possible to form different radial stop profiles with free stop ends, wherein the hydroelastic operating state, i.e. after the final assembly state is achieved, stop-free dislocation paths between the mounting inner connection and the mounting outer connection are avoided because the stop directly engages the stop counterpiece as a result of its mounting movability without an operating load acting. In addition, it is possible to place the elastic spring body of the radial stop itself under a radial compressive pre-stress or pre-compression by appropriate dimensioning of the spring body and/or of the displacement so that path limitation effects are appreciable even with shorter dislocations of the radial stop in the radial direction of action.

The stop counterpiece is either realized in the region of the mounting inner connection when the radial stop extends radially inwards from the mounting outer connection or in the region of the mounting outer connection when the radial stop extends radially outwards from the mounting inner connection. The radial stop preferably extends radially inwards from the support frame in order to cooperate with the stop counterpiece on the mounting inner connection, which for example can be formed by a rigid inner sleeve.

Depending on how the radial stop and the stop counterpiece are configured, through the measure of the displaceability of the stop end from a pre-assembly state into a final assembly state, compressive stresses can be built up both in the elastic spring body of the radial stop and also in an elastic counterbody of the stop counterpiece on reaching the final assembly position.

In a preferred embodiment, the static pre-compression in the elastic radial stop and/or in the elastic stop counterpiece achieved by bringing the spring functional component into the final assembly position is adjustable by fixing a displacement of the support section between the pre-assembly state and the final assembly state.

In a further embodiment, the support frame has a rigid basic framework which can be sleeve-shaped. The radially outer and/or inner contour of the sleeve-shape basic framework can be cylindrical or at least define a step-free, preferably cylindrical envelope curve. In a further embodiment, in the pre-assembly state a base of the radial stop opposite the stop end projects radially beyond the radially outer and/or inner contour of the sleeve shape. The circumference of the projecting overhang determines the displacement of the radial stop between the pre-assembly state and the final assembly state. In the final assembly state the radial stop preferably lies completely on one radial side of the radially outer and/or inner contour of the sleeve-shaped basic framework. The dislocation is then achieved whereby the radially projecting section of the base of the radial stop is pressed radially and forced into the final assembly position for example, during pressing into a receptacle for the spring functional component formed to be complementary in shape to the sleeve-shaped basic framework.

Preferably at least one of the mounting connections is formed by the in particular cylindrical contour of the basic framework facing away from the stop counterpiece so that the spring functional component can be simply inserted into a corresponding cylindrically shaped receptacle, whereby a definedly limited dislocation of the radial stop from the pre-assembly position into the final assembly position is achieved.

The base of the radial stop can be formed from elastomer, wherein the base is connected to the support frame via an elastomeric web such as an elastomeric film hinge so that in the pre-assembly state the radial stop is held movably on the support frame. During mounting of the spring functional component, the elastically movable radial stop is then forced into the final assembly position in which the radial stop loses its mounting movability.

In a further embodiment, the radial stop has a base plate and a spring body having the stop end, the spring body being fastened to an inner side of the base plate facing the stop counterpiece. The base plate is formed from a rigid material such as plastic or metal whereas the spring body can be realized using an elastomeric material.

In a preferred embodiment, the base plate is held on the rigid basic framework of the support frame by means of a pre-determined breaking or pre-determined bending point such as a pre-determined breaking or pre-determined bending web or, for a base plate fabricated separately from the support frame, via an elastic linkage such as an elastomeric film hinge, in the pre-assembly state.

The pre-determined breaking point or pre-determined bending point is designed to allow a defined dislocation of the base plate relative to the basic framework when the final assembly state is to be achieved. Alternatively in the pre-assembly state the base plate can be movably coupled by elastomer bridges or an elastomer film hinge, wherein in the final mounting state the base plate is in frictional or non-positive contact with the basic framework. For this case different rigid materials can be used for the base plate and the support frame.

Preferably for the dislocation of the radial stop from the pre-assembly state into the final assembly state, an actuating side of the base plate facing away from the stop counterpiece is freely accessible in order to introduce the necessary mounting force into the radial stop. The base plate is only moved and acted upon by mounting forces during insertion of the spring functional component. Preferably the actuating side is formed at least in sections, preferably over the entire area thereof, as a contour continuation of the radially outer and/or inner contour of the basic framework in order to achieve a simple insertion, for example, into a mounting bushing to form the hydroelastic bearing. The actuating side can be partly cylindrical.

In a further embodiment, the base plate has an in particular central curvature extending radially to the stop counterpiece on which the spring body is fastened. The curvature can project into one of the working chambers.

In a further embodiment, the rigid base plate and the rigid basic framework come into a stop contact on reaching the final assembly position so that a further dislocation of the at least one radial stop is prevented per se. An elastic deformation of the at least one radial stop caused by the operation of the hydroelastic bearing is naturally desired and allowed after reaching the final assembly position. The limitation of the mounting dislocation starts on reaching a pre-determined radial displacement. Preferably the displacement is formed by contact of sections of the basic framework and the base plate. Preferably the stop section of the basic framework can be disposed adjacent to the pre-determined breaking or pre-determined bending point or the elastomer bridges. The stop section of the base plate can be realized by a circumferential edge of the rigid base plate, which preferably surrounds the centrally disposed curvature.

In a preferred embodiment, in the final mounting state in particular as a result of the breaking of a pre-determined breaking web, the radial stop, in particular its base plate, is connected by friction or non-positively to the support frame. It is thereby ensured that the stop forces can be relayed reliably and in a force-transmitting manner from the mounting inner connection to the mounting outer connection and conversely. It shall be clear that the rigid base plate can firmly engage the basic framework, optionally with an elastomeric layer interposed.

In a preferred embodiment, the support frame has a pair of radial passages or openings for each of the working chambers which lie diametrically opposite in particular in the radial direction and on the outer side of the support frame, in particular in their course through the support frame, are formed substantially congruently with the respective radial opening and/or mirror-symmetrically to a radial plane of the support frame. Respectively one radial stop is disposed between the pairwise radial passages. The radial passage which can also be provided individually for provision of an access opening serves primarily to allow the forming tool to access into the inner region defined by the support frame in order to form the inner profile together with radial stop during the formation of the elastomer body. After the formation of the elastomer body together with radial stop during fabrication of the hydroelastic bearing, the radial passage is closed in a fluid-tight manner by an internal or external fitting such as an inner or outer sleeve. For this purpose the radial passage can be provided with an elastomer coating in order to ensure an adequate tightness and large manufacturing tolerances in relation to the dimensioning of the radial passage and the external or internal fitting.

In a further embodiment, in addition to the radial stop, the spring body has at least two spring arms for elastically coupling the mounting inner or outer connection on the support frame. The spring arms are arranged offset to the radial stops in circumferential direction. When providing two diametrically opposite radial stops, two opposite spring arms are provided where the spring arms in the circumferential direction are arranged relative to the radial stops at a circumferential distance of substantially 90°.

The at least two spring arms extend in the radial direction substantially further than the at least one radial stop in the pre-assembly state. Preferably the at least two spring arms are molded or sprayed onto a fitting forming the mounting connection so that the at least two spring arms extend in coupling contact between the support frame and the mounting connection. Only after bringing the at least one radial stop into the final assembly state is there also a contact coupling between the mounting connection and the support frame. The at least two spring arms extend diametrically substantially in a radial direction from the mounting inner connection or mounting outer connection towards the inner or outer side of the support frame. Two diametrically opposite radial stops can also be disposed on the support frame, which delimit the relative movability of the mounting connections in a radial direction, which lies in particular substantially perpendicular to the direction of extension of the spring arms. Both radial stops can pass from the pre-assembly state into the final assembly state wherein also only one of the radial stops can experience a dislocation between the two assembly states whilst the other radial stop does not experience any change in position when bringing the spring functional component into the final assembly state.

The spring arms can be column-shaped and continuous so that the spring arm extends free from interruption in contact with the mounting inner connection towards the inner side of the support frame into contact with it. The spring arms are not formed fully circumferentially but are limited in the circumferential direction in order to provide a certain spring stiffness in the direction of extension of the spring arms. In the circumferential direction, the at least one radial stop lies offset with respect to the spring arms. The spring stiffness or spring rate of the hydroelastic bearing in one principal radial direction is realized by means of the spring arms to be differently stiff than in an auxiliary radial direction angularly offset from the principal radial direction in which substantially the radial stops positioned in the working chambers lie, which only provide an adjusted spring stiffness in the auxiliary radial direction in the final assembly position when the free stop ends come in contact with the stop counterpiece. Principally however the radial stops serve to limit the movement in the auxiliary radial direction having a small amplitude whilst a dislocation in the principal radial direction with large amplitude should be allowed.

The radial stops fastened to the inner side of the support frame preferably extend perpendicular to the direction of extension (principal radial direction) of the spring arms.

In a preferred embodiment the support frame is an in particular substantially cylindrical bushing and can, for example, comprise two closed annular edge sections which extend in particular in an annular shape. The annular edge sections can lie diametrically opposite one another in the axial direction substantially having the same dimensions and are rigidly connected to one another by a plurality of, preferably four, transverse struts of the support frame which extend substantially in the axial direction. The axial struts can substantially delimit two radial passages in particular in a circumferential direction.

Preferably a section of a transverse strut forms the base plate of the radial stop. Radial stop transverse struts can lie diametrically opposite one another in pairs and have substantially the same shape.

In a further embodiment, a groove system for fluid communication between the otherwise hydraulically isolated working chambers is formed on an in particular substantially cylindrical outer side of the supporting frame, in particular on a transverse strut for the coupling spring arms and/or annular edge sections. For example, the annular edge sections of the sleeve-like supporting frame can each have on the outer side thereof an annular groove formed at the endside in the axial direction in which a radially projecting circumferential sealing protuberance is disposed.

In a preferred embodiment, the at least two working chambers are closed in both axial directions between one of the two mounting connections and the supporting frame by circumferential flexible annular elastomer wall sections. When reaching the pre-assembly state, the working chambers are only open on the circumferential side through the at least one radial access in the support frame and are only closed when the spring functional component is mounted on the mounting outer connection to achieve the final assembly state by for example using a sleeve-shaped connecting part.

According to another embodiment disclosed herein, at least one radially inwardly extending radial stop is fastened to the radial inner side of the support frame which is intended to restrict the radial relative movability of the mounting connections of the spring functional component at least in one radial direction. Preferably the at least one radial stop lies completely in a working chamber and is surrounded by the working fluid in the operationally ready state of the hydroelastic bearing. The radial stop lying in the working chamber influences the damping property of the hydroelastic bearing insofar as during stop deformation of the radial stop, the spring stiffness of the hydroelastic bearing increases whereby also the internal volume of the working chamber is varied with the deformation of the radial stop which leads to a dampening exchange flow of fluid between the working chambers.

With embodiments disclosed herein it is possible to provide a hydroelastic bearing having a single-part, sleeve-shaped support frame which stiffens the spring body in a simple manner even for production with large numbers of items, where a radial stop having an only small axial extension in the radial outer region of the working chamber can be achieved. Despite the small axial extension of the radial stop a sufficient strength of the radial stop can be ensured. Via the radial access a shaping tool can enter into the interior of the support frame between the position of the mounting inner connection and the support frame, wherein the working chambers together with other elastomeric parts such as the radial stop are formed in particular being molded or injected at the same time. The at least one radial stop can be formed from an elastomeric material and is molded onto the inner side of a base plate of the support frame. The free stop end is arranged in the pre-assembly state at a distance from the inner fitting. Preferably the at least one radial stop is arranged in the respective working chamber substantially in the axial and/or radial center thereof.

In order to provide the simplest possible manufacture of the hydroelastic bearing disclosed herein, the support frame has a pair of radial passages for each working chamber which in particular in the radial direction lie diametrically opposite one another and which are substantially congruent with the respective radial opening of the spring functional component, wherein the radial openings possibly as a result of an elastomeric coating of the edge regions of the radial passages of the support frame are slightly smaller in average cross-section than the radial passages. A rectilinear undercut-free forming tool can be pushed along a rectilinear insertion direction through both radial passages. Then both the working chambers and also the respective radial stop located therein can be formed in a single working step with the free stop end extending from the outer side of the support frame. After forming the spring body, the forming tool is removed from the radial passage whereby the respective working chambers are open at the radial passage and are only closed during mounting into a corresponding inner or outer fitting. When the forming tool is removed, the spring functional component is completed in the pre-assembly state. If the spring functional component is then put into operation, by installing it in the motor vehicle or by connecting it to an outer or inner fitting, the dislocation of the radial stop and the final assembly state is achieved and the corresponding radial passages are closed. The respective radial stop is disposed between the pairwise radial passages/radial openings.

The pair of radial passages are aligned in such a manner that the rectilinearly extending undercut-free forming tool can be inserted through both radial passages during a rectilinear insertion movement. After the injection process of the elastomeric spring body, the rectilinear forming tool can be withdrawn in the opposite direction to the direction of insertion via the radial passages, with the result that a majority of the inner wall of the working chamber together with the radial stop located therein and the respective radial opening are formed. A two-part nature of the support frame or a separate arrangement of a separately produced radial stop is not necessary. On the contrary, the at least one radial stop may be combined as a one-piece component with the spring body in the spring functional component.

The pairwise radial passages can each have an axial edge opposite one another in the direction of insertion lying close to the axial axis of the sleeve-shaped support frame, which preferably extends straight parallel to the axial axis. Both opposite axial edges of the radial passages of the support frame are positioned such that in the event of inserting an inner fitting as mounting inner connection, the axial edges lie in a substantially tangential secant plane which touches the in particular cylindrical inner fitting or at least passes cut-free at small radial distance. This means that in the inserted state of the forming tool a gap can still be formed between the forming tool and the inner fitting in order to provide a contact-free movement of the stop end towards the mounting inner connection.

In a preferred embodiment, the cross-section of the at least two working chambers is U-shaped in the axial direction of the support frame. The radial stop is surrounded by the U-legs of the U-shaped cavity of the working chambers.

In a preferred embodiment, the support frame is an in particular substantially cylindrical bushing or sleeve or a sleeve-shaped cage. The support frame can comprise two closed annular edge sections which run round in a closed ring shape. The annular edge sections can each form the axial end of the supporting frame. The annular edge sections can be circular-ring shaped. Preferably the annular edge sections lie diametrically opposite one another in the axial direction having substantially the same dimensions.

In a preferred embodiment, the sleeve-shaped support frame has a plurality of, preferably four, transverse struts which rigidly interconnect the annular edge sections. The transverse struts extend substantially in the axial direction and are rigidly interconnected via the annular edge sections. Two adjacent transverse struts can delimit the at least one radial passage of the support frame in particular in its circumferential direction and can form the axial edge of the radial passage which extends rectilinearly in the axial direction.

A spring arm of the spring body which couples the support frame to the mounting inner connection is fastened to a transverse strut on which no radial stop is disposed. A pair of supporting transverse struts on which two spring arms are supported have in particular substantially the same circumferential width along the axial direction. A clear width of the transverse strut viewed in the radial direction preferably corresponds to the clear width in the radial direction of an inner sleeve forming the mounting inner connection, in particular its outside diameter.

In a further embodiment disclosed herein, the radial stop is fastened to an in particular cylindrical inner side of a stop transverse strut of the support frame which can at least partially form the base plate of the radial stop. The base plate can be released in relation to the transverse strut when it is separated from the transverse strut at the pre-determined breaking point. The base plate can also be fabricated separately from the transverse strut so that two differently rigid materials can be used for the transverse strut of the support frame and the base plate of the radial stop. The separately fabricated base plate can be fastened movably on the transverse strut by means of an elastic linkage such as an elastomeric film hinge implements a coupling between the base plate and the transverse strut. Preferably a pair of radial stops is held on a pair of opposite stop transverse struts.

A pair of radially extending spring arms of the spring body may be fastened by friction or non-positively on a pair of opposite support transverse struts in order to couple the support frame and the mounting inner connection to one another in a vibrational and frictional manner. Stop transverse struts and support transverse struts are arranged alternately in the circumferential direction. An imaginary axial central line of each transverse strut is disposed in the axial central line of the neighboring transverse strut substantially at an angle of 80°-100°, preferably at an angle of 90°. The circumferential width of the opposite support transverse struts can be the same size, wherein the clear width thereof viewed in the radial direction is slightly greater than the clear width of an optionally used inner sleeve.

Preferably the stop transverse struts and/or the support transverse struts are arranged in diametrically opposite pairs. The stop transverse struts and the support transverse struts can each be substantially of the same shape. The at least one radial passage is delimited in the circumferential direction by a support transverse strut and an adjacent circumferentially offset stop transverse strut in the axial direction by the annular edge sections.

In a further embodiment, the support transverse strut has a cylinder-section-shaped inner side. The radius of the inner side can correspond to a distance from the axial axis of the spring functional component. A radial thickness of the stop transverse strut can be greater than that of the support transverse strut. A radial distance of the stop transverse strut to the mounting inner connection can be shorter than that of the support transverse strut.

In a further embodiment, a groove system for forming the fluid communication between the working chambers is formed on an in particular substantially cylindrical outer side of the support frame in particular the support transverse struts and/or the annular edge sections. Here it can be provided that the stop transverse strut is free from grooves of the groove system. Preferably the annular edge sections each have on the outer side thereof an annular groove formed at the endside in the axial direction in which a projecting circumferential sealing protuberance, in particular made of elastomer material is disposed. The annular groove can lie axially next to a groove course of the groove system in the annular edge section. The sealing protuberance serves to seal the groove system in the axial direction. The arrangement of the sealing protuberance in the circumferential annular groove ensures a secure circumferential sealing surface after the spring functional component has been pressed into an outer sleeve or bushing. The projecting elastomer material of the sealing protuberance can escape into the annular groove. This has the result of avoiding damage to the sealing protuberance during pressing of the spring functional component into an outer sleeve.

In a preferred embodiment, the spring body, the at least one radial stop and optionally the sealing protuberance are molded from one elastomer piece, in particular onto the support frame, wherein in particular the spring arms of the spring body can be molded onto an inner fitting. In a preferred embodiment, both the support frame and an inner fitting are embedded completely in the spring body, where the support frame provides a stiffening of the elastomeric body, in particular on its radial outer side.

In a preferred embodiment, the working chambers lie axisymmetrically to a radial axis of the bearing. As indicated above, the working chambers at the open radial passage of the support frame and optionally the groove system realized on an outer side of the support frame can be sealed in a fluid-tight manner by a separate outer fitting. The outer side of the support frame can be completely covered by an elastomer coating in order to seal the groove system formed there after insertion with a connection part. The mounting inner connection of the spring functional component can be formed by the elastomer coating.

In a further embodiment disclosed herein the mounting inner connection is formed by an inner sleeve. The inner sleeve can have a projection arranged in particular substantially centrally in the axial direction which lies diametrically opposite the respective radial stop and/or forms a stop intervention point. The stop intervention point can be flat and substantially uncurved. In addition, the stop intervention point can have a lateral undercut whereby the area of the stop intervention point is enlarged.

Preferably the mounting inner connection is embedded completely in a spring body which in particular radially inwards has a receptacle for a vibration-loaded component such as a motor vehicle component.

Furthermore, aspects of the invention relate to a hydroelastic bearing having a spring functional component. In order to realize the hydroelastic bearing, the spring functional component is inserted in an outer fitting in such a manner that the at least two working chambers are closed in a fluid-tight manner at the radial opening thereof. The outer fitting can be a separate outer sleeve or bushing or a corresponding receptacle in a motor vehicle component which is formed complementary to the mounting outer connection of the spring functional component.

Further features, properties and advantages are clear from the following description of preferred embodiments by reference to the appended drawings, in which:

FIG. 1 shows a perspective view of a hydroelastic bearing according to an embodiment of the invention which contains a spring functional component according to an embodiment of the invention;

FIG. 2 shows a longitudinal sectional view of a support frame made of plastic for the spring functional component of the hydroelastic bearing according to FIG. 1;

FIG. 3a shows a longitudinal sectional view of the spring functional component according to an embodiment for the hydroelastic bearing according to FIG. 1 in a pre-assembly state;

FIG. 3b shows a longitudinal sectional view of the spring functional component according to FIG. 3a in the final assembly state;

Figure 4:
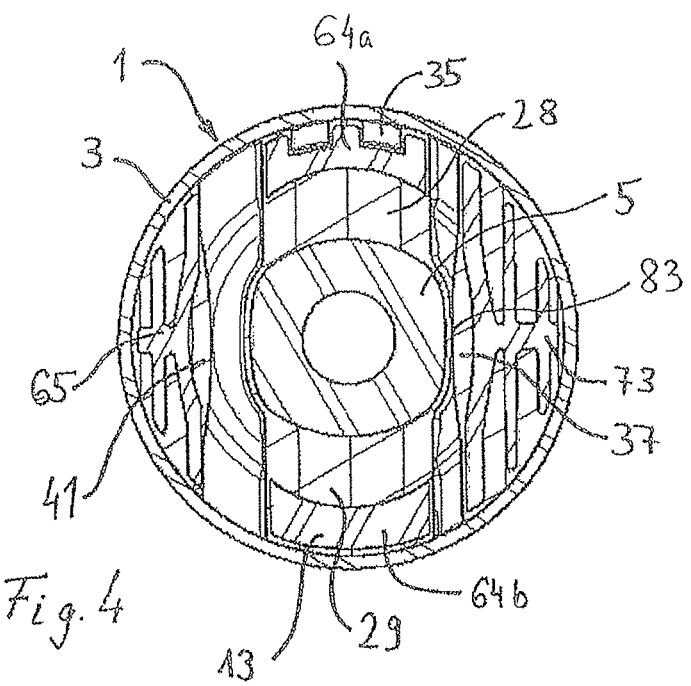
FIG. 4 shows a cross-sectional view of the hydroelastic bearing according to FIG. 1, wherein the line of intersection IV-IV is taken according to the position shown in FIG. 3b.
Figure 5:
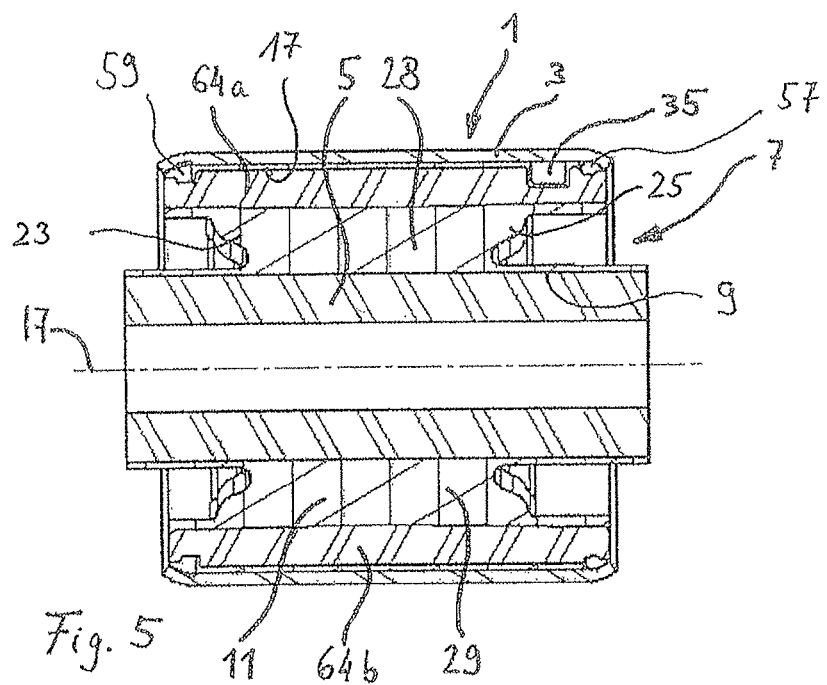
FIG. 5 shows a longitudinal sectional view of the hydroelastic bearing from FIG. 4.

In FIG. 1 the hydroelastic bearing according to according to one embodiment of the invention is generally designated with the reference number 1 and comprises a bushing-shaped outer fitting 3, an inner fitting 5 formed as an inner sleeve, which like the outer fitting 3 is made from a rigid material such as metal or plastic and a spring functional component 7 which elastically dampens the outer fitting 3 and the inner fitting 5, which is shown in detail in FIGS. 3a and 3b.

The spring functional component 7 for the hydroelastic bearing 1 has as its main components a mounting inner connection which in the embodiments shown according to FIGS. 3a and 3b is to be understood as the inner passage 9 receiving the inner sleeve 5, a spring body 11, which is molded from an elastomeric material onto the outer side of the inner sleeve 5 so that the outer side of the inner sleeve 5 is completely covered by an elastomer layer, and a support frame 13, whose exclusive detailed design is apparent in FIG. 2, and a mounting outer connection 15 which in the embodiments of the spring functional component 7 shown in FIGS. 3a and 3b is to be understood by the outer side 17 of the support frame 13 possibly covered with elastomer.

The spring functional component 7 defines an axial direction A and radial directions R perpendicular thereto.

The inner sleeve 5 has a cylindrical receptacle 21 for a supporting bolt of a motor vehicle functional component such as a bearing axle.

The spring body 11 delimits by means of circumferential annular side walls 23, 25 respectively two hydraulic working chambers 31, 33 which are filled with a damping fluid in the assembled state of the hydroelastic bearing 1. The working chambers 31, 33 are in fluidic communication via a channel system 35 so that an exchange of fluid between the working chambers 31, 33 can take place according to the deformation of the spring body 11.

Furthermore the spring functional component 7 has an elastic radial stop 37, 41 which lies in each working chamber 31, 33 and like the spring body 11 is formed from an elastomer material. One another offset by about 90° in the circumferential direction are elastomeric spring arms 28, 29 positioned diametrically opposite and extending in the radial direction, wherein the spring arms 28, 29 have a supporting effect between the support frame 13 and the inner fitting 5.

All the elastomer components such as the side wall 23, the coating layer on the inner fitting 5, the spring arms 28, 29 and the radial stops 37, 41 are injection molded from one piece of elastomer onto the inner fitting 5 or onto the supporting frame 13.

At the spring functional component 7, the working chambers 33, 31 in a pre-assembly state are open on the circumferential side of the spring functional component 7 through diametrically opposite radial openings or passages 43, 45. The radial openings are then closed in a fluid-tight manner when the spring functional component 7 is pressed into the outer fitting 3 where the final assembly state according to FIG. 3b is then achieved to form the hydraulic bearing 1.

The support frame 13, as is depicted in the greatest detail in FIG. 2, before injection and vulcanizing the elastomer spring body 11 has a cage-like sleeve shape which defines a radially outer cylindrical envelope curve 51. As can be seen in FIGS. 2 and 3a the cylindrical envelope curve 51 is defined by the largest part of the radially outer side of the support frame 13, wherein the channel system 35 for the fluidic connection of the working chambers 31, 33 is formed on the cylindrical outer side. In addition on the cylindrical outer side of the support frame 13 in the region of both axial ends there is formed a compensation groove 53, 55 in which an elastomer sealing lip 57, 59 is formed. When inserting the spring functional component 7 into the outer fitting 3, as a result of the resilience of the sealing lip 57, 59 it is achieved by escape into the respective compensation groove 53, 55 that the sealing lip 57, 59 is not damaged and the channel system 35 is fluid-tight in the radial direction R.

The sleeve-shaped support frame 13 is formed in a cage shape and has congruent radial openings 43, 45 opposite one another into which a forming tool such as a forming blade can be inserted perpendicular to the plane of the drawing in FIGS. 2, 3a and 3b in order to then mold on and form the elastomer body 11 on the support frame 13 and optionally on the inner sleeve 5.

The sleeve-shaped support frame 13 has two annular edge sections 61, 63 which are closed completely circumferentially and give the support frame 13 a high stability. The annular edge sections 61, 63 are rigidly interconnected by a plurality of transverse struts 64a, 64b 65, 67. Two opposite transverse struts 64a, 64b carry the spring arms 28, 29 which elastically couple the support frame 13 to the inner fitting 5. Two opposite transverse struts 65, 67 carry the radial stops 41, 37. One of the transverse struts 67 is formed with a pre-determined breaking point in the form of several pre-determined breaking webs 71, wherein in the undestroyed state of the pre-determined breaking point 71a rigid base plate 73 of the radial stop 37 projects radially beyond the cylindrical envelope curve 51 by several millimeters, wherein the projection is shown by r in FIG. 2. The base plate 73 can be fabricated from the same rigid material compared as the support frame 13. Also a material different with respect to the support frame 13 can be elected for the base plate. In this case, the base plate is merely movably fastened to the transverse strut 67 of the support frame by means of an elastomer film hinge.

The base plate 73 comprises a central curvature 75 which projects radially inwards into the working chamber 45 at the pre-determined breaking point 71. The curvature 75 surrounds a rigid stop edge 77 of the base plate 73 which is slightly inclined with respect to the axial direction A. As can be seen from FIG. 4, the base plate 73 in cross-section has a tree structure with radially centrally disposed trunk and a plurality of branches running substantially parallel to one another and perpendicular to the trunk. The space between the branches is completely injected with elastomer material.

The (movable during assembly) stop edge 77 lies opposite a stop ring 79 of the (fixed) transverse strut 67 (see FIGS. 3a and 3b), wherein the side of the annular stop 79 facing the edge stop 77 is inclined complementary in shape so that the two edge sections 77, 79 lie flat against one another as soon as the pre-determined breaking point 71 is destroyed and the base plate 73, that is the radial stop 37 which is movable during assembly, moves from its pre-assembly position shown in FIGS. 2 and 3a into the final assembly position which can be seen in FIGS. 3b and 4. In the end assembly position the base plate 73 is pressed in a fixed position between the stop ring 79 of the transverse strut 67 and the outer fitting 3, wherein the spring body of the radial stop 37 is pre-stressed to a pre-set radial compression. The spring body of the radial stop 37 still ensures a small elastic radial mobility of the radial stop 37 between the mounting inner and outer connection 9, 15.

Upon rupture of the pre-determined breaking point 71, the partially cylindrical outer side 81 of the base plate 73 coincides with the cylindrical envelope curve 51 as indicated in FIG. 3b.

In the pre-assembly state which can be seen in FIG. 3a, the radial stop 37, it particular its free stop end 83 is disposed at a distance v from the outer side of the inner sleeve which is smaller than the overhang r.

The spring functional component 7 can be mounted in stock in the pre-assembly state and as soon as it is mounted, the cylindrical mounting outer connection 15 is pressed into a correspondingly shaped cylindrical receptacle like that of the outer fitting 3 whereby on the one hand the channel system 35 and the radial openings 43, 45 are sealed in a fluid-tight manner and on the other hand, the pre-determined breaking web 71 are destroyed and the base plate 73 together with stop end 83 is displaced in the radial direction R towards the inner fitting 5 until the stop end 83 comes in contact with the outer side of the inner sleeve 5. In the final assembly state, the spring body of the radial stop 37 is pre-stressed under compression or pre-compressed depending on the dimensioning of the overhang r in relation to the distance v. If an elastomeric protuberance (not shown) is provided on the stop counterpiece opposite the radial stop 37, this can also be pre-stressed under compression as a result of the dislocation of the radial stop 37 into the final assembly state.

The stop edge 77 and the annular edge 79 lie non-positively against one another so that movement stop forces can be transferred by friction from the inner sleeve 5 into the support frame 13 and into the outer fitting 3.

With the measure to enable displaceability of the elastic radial stop towards the mounting inner or outer connection, radial stops which are contact-free after their manufacture can be brought into direct contact with the stop counterpiece, here the inner fitting, and the spring body of the radial stop and optionally of the stop counterpiece can even be pre-stressed under compression. In this way long stop-free paths of the radial stop are avoided. It has also been shown that the radial stop with pre-stressed spring body achieves a significantly longer lifetime than path limiting stops which must withstand a stop shock load and in particular are achieved without compressive pre-stress.

The features disclosed in the preceding description, the figures and the claims can be important both individually and in any combination for implementing the invention in the various embodiments.

LIST OF REFERENCE NUMERALS

1 Hydroelastic bearing
3 Outer fitting
5 Inner fitting (mounting inner connection)/inner sleeve
7 Spring functional component
9 Inner passage (mounting inner connection)
11 Spring body
13 Support frame
15 Mounting outer connection
17 Outer side
21 Cylindrical receptacle
23 Side wall
28, 29 Spring arms
31, 33 Hydraulic working chamber
35 Channel system
37, 41 Radial stop
43, 45 Radial opening
51 Envelope curve
53, 55 Compensating groove
57, 59 Sealing lip (sealing protuberance)
61, 63 Annular edge sections
65, 67 Transverse struts
71 Pre-determined breaking web
73 Base plate
75 Curvature
77 Stop edge (circumferential edge)
79 Stop ring
81 Outer side
83 Stop end
87 Stop counterpiece
A Axial direction
R Radial direction
r Overhang (displacement)
v Distance

What is claimed is:
1. A spring functional component for a hydroelastic bearing, the spring functional component comprising:

a mounting inner connection;
a mounting outer connection radially surrounding the mounting inner connection;
a spring body which delimits at least two working chambers for receiving a damping fluid and couples the mounting inner and outer connections to one another in order to allow a relative movability between the mounting inner and outer connection and a support frame surrounding the mounting inner connection, the support frame being made of a rigid material, on which support frame at least one radial stop is held,
wherein the at least one radial stop can be displaced from a pre-assembly state, in which a stop end of the at least one radial stop is disengaged with respect to a stop counterpiece on the mounting inner connection side or mounting outer connection side, into a final assembly state in which the stop end engages the stop counterpiece and
wherein the at least one elastic radial stop comprises a base plate having an inner side and a spring body having the stop end, the spring body being fastened to the inner side of the base plate facing the stop counterpiece, wherein the base plate is held on a rigid basic framework of the support frame by means of a predetermined breaking or predetermined bending web or an elastic linkage in the pre-assembly state which allows a displacement of the base plate relative to the basic framework.

2. The spring functional component according to claim 1, in which the at least one radial stop, the stop counterpiece, or both are elastic and pre-compressed in the final assembly state, wherein the static pre-compression in the at least one radial stop, the stop counterpiece, or both are adjustable by defining a displacement path of the at least one radial stop between the pre-assembly state and the final assembly state.

3. The spring functional component according to claim 1, wherein the rigid basic framework comprises a sleeve shape, wherein a radially outer contour, radially inner contour, or both of the sleeve shape is cylindrical or at least defines a cylindrical envelope curve, and in the pre-assembly state a base of the at least one radial stop opposite the stop end projects radially beyond the radially outer contour, the radially inner contour, or both of the sleeve shape, wherein the at least one radial stop in the final assembly state lies completely on a radial side with respect to the radially outer contour, the radially inner contour, or both, wherein at least one of the mounting connections is formed by the cylindrical contour of the basic framework facing away from the stop counterpiece.

4. The spring functional component according to claim 3, wherein for the displacement of the at least one radial stop from the pre-assembly state into the final assembly state, an actuating side of the base plate facing away from the stop counterpiece is at least one of: freely accessible in order to introduce a mounting force into the at least one radial stop, and formed at least in contour sections as at least one of a contour continuation of the radially outer contour of the basic framework or the radially inner contour of the basic framework.

5. The spring functional component according to claim 4, wherein the actuating side of the base plate facing away from the stop counterpiece is formed at least in sections over the entire area thereof.

6. The spring functional component according to claim 4, wherein the actuating side is partly cylindrical.

7. The spring functional component according to claim 4, wherein the base plate has a central curvature extending radially to the stop counterpiece on which the spring body is fastened and/or which projects radially into one working chamber of the at least two working chambers.

8. The spring functional component according to claim 4, wherein the base plate and the basic framework implement a limitation of the displacement which stops a displacement of the at least one radial stop as far as a radial displacement limit and is formed by impact of a respective stop section of the basic framework and of the base plate.

9. The spring functional component according to claim 8, wherein the stop section of the basic framework is disposed adjacent to the pre-determined breaking or pre-determined bending web and the stop section of the base plate is realized by a circumferential edge of the base plate that surrounds a curvature.

10. The spring functional component according to claim 1, wherein at least in the final assembly state as a result of the breaking of the pre-determined breaking web, the base plate of the at least one radial stop is connected by friction to the support frame, wherein the base plate is rigid and abuts firmly against the basic framework.

11. The spring functional component according to claim 1, wherein the support frame for each one of the at least two working chambers defines a pair of radial passages which lie diametrically opposite to one another in the radial direction and which radial passages are formed substantially congruently with each respective radial opening in their course through the support frame and on the outer side of the support frame, and are formed mirror-symmetrically, or both to a radial plane of the support frame, wherein one of the at least one elastic radial stop is disposed between the pair of radial passages.

12. The spring functional component according to claim 1, wherein the spring body has at least two spring arms for the elastic coupling of the mounting inner connection or the mounting outer connection on the support frame, wherein the two spring arms extend substantially diametrically in a radial direction from the mounting inner connection or mounting outer connection towards the inner or outer side of the support frame, wherein the at least one radial stop comprises two diametrically opposite radial stops fastened to the support frame, the two diametrically opposite radial stops delimiting the relative movability of the inner mounting connection and the outer mounting connection in a radial direction, which lies substantially perpendicular to the direction of extension of the spring arms.

13. The spring functional component according to claim 1, wherein the support frame comprises at least one of a substantially cylindrical bushing and two closed annular edge sections, where the two closed annular edge sections extend in an annular shape, lying diametrically opposite one another substantially having the same dimensions in the axial direction, and being rigidly connected to one another by a plurality of transverse struts of the support frame.

14. The spring functional component according to claim 13, wherein the plurality of transverse struts extend substantially in the axial direction, delimiting at least two radial passages in a circumferential direction, or a combination thereof.

15. The spring functional component according to claim 13, wherein at least one of a section of a transverse strut of the plurality of transverse struts forms the base plate of the at least one elastic radial stop.

16. The spring functional component according to claim 13, wherein the plurality of transverse struts comprises four struts.

17. The spring functional component according to claim 13 wherein a groove system for fluid communication between the at least two working chambers is formed on a substantially cylindrical outer side of the support frame and comprises at least two one annular grooves, wherein the annular edge sections of the support frame each have on the outer side thereof one of the two annular grooves formed at the end side in axial direction in which a radially projecting circumferential sealing lip is disposed.

18. The spring functional component according to claim 1, wherein at least one of: the at least two working chambers between the two mounting connections are closed in both axial directions by circumferential wall sections, and one of the at least two working chambers leads into at least one radial opening which is open towards the radial outer side of the spring functional component which radial opening can be closed by a connection part to be coupled to the mounting outer connection.

19. A hydroelastic bearing comprising:
an outer fitting; and
a spring functional component comprising:
 a mounting inner connection;
 a mounting outer connection radially surrounding the mounting inner connection;
 a spring body which delimits at least two working chambers for receiving a damping fluid and couples the mounting inner and outer connections to one another in order to allow a relative movability between the mounting inner and outer connection and a support frame surrounding the mounting inner connection, the support frame being made of a rigid material, on which support frame at least one radial stop is held,
wherein the at least one radial stop can be displaced from a pre-assembly state, in which a stop end of the at least one radial stop is disengaged with respect to a stop counterpiece on the mounting inner connection side or mounting outer connection side, into a final assembly state in which the stop end engages the stop counterpiece,
and
wherein the at least one radial stop comprises a base plate having an inner side and a spring body having the stop end, the spring body being fastened to the inner side of the base plate facing the stop counterpiece, wherein the base plate is held on a rigid basic framework of the support frame by means of a predetermined breaking or predetermined bending web or an elastic linkage in the pre-assembly state which allows a displacement of the base plate relative to the basic framework, and
wherein the spring functional component is inserted in the outer fitting in such a manner that the at least two working chambers are closed in a fluid-tight manner at a radial opening thereof.

* * * * *